United States Patent [19]

Skinner

[11] Patent Number: 4,913,245

[45] Date of Patent: Apr. 3, 1990

[54] WELLBORE DRILLING CUTTINGS TREATMENT

[75] Inventor: James L. Skinner, Plano, Tex.

[73] Assignee: Atlantic Richfield Company, Los Angeles, Calif.

[21] Appl. No.: 6,290

[22] Filed: Jan. 20, 1987

Related U.S. Application Data

[63] Continuation of Ser. No. 677,658, Dec. 3, 1984, abandoned.

[51] Int. Cl.$^4$ ............................................. E21B 21/06
[52] U.S. Cl. ..................................... 175/66; 175/206; 34/209; 210/180; 210/182; 210/189; 210/770
[58] Field of Search .............. 175/66, 206, 207; 34/209; 210/180, 182, 189, 770; 422/900; 423/18

[56] References Cited

U.S. PATENT DOCUMENTS

| | | | |
|---|---|---|---|
| 3,693,951 | 9/1972 | Lawhon et al. | 134/19 |
| 4,208,285 | 6/1980 | Sample, Jr. | 175/206 |
| 4,209,381 | 6/1980 | Kelly | 175/206 |
| 4,222,988 | 9/1980 | Barthel | 175/66 |
| 4,387,514 | 6/1983 | McCaskill, Jr. | 175/206 |
| 4,411,074 | 10/1983 | Daly | 175/66 |
| 4,453,319 | 6/1984 | Morris | 175/206 |

Primary Examiner—Bruce M. Kisliuk
Attorney, Agent, or Firm—Roderick W. MacDonald

[57] ABSTRACT

A method and apparatus for drilling a wellbore in the earth from a location in a body of water wherein the drilling operation generates a substantial amount of a mixture of solid drilling cuttings, water, and at least one hydrocarbonaceous oil, wherein the water and oil are removed from the solid drilling cuttings so that the cuttings are put into a condition in which they can be disposed of in the body of water or elsewhere without adverse effects.

4 Claims, 2 Drawing Sheets

WELLBORE DRILLING CUTTINGS TREATMENT

This application is a continuation of application Ser. No. 677,658, filed Dec. 3, 1984, now abandoned.

BACKGROUND OF THE INVENTION

When drilling a wellbore in the earth, solid particles such as rock cuttings formed by the drilling bit action are recovered at the drilling rig and have to be disposed of in an acceptable manner. The disposal of drilling cuttings from offshore wells which are located in a body of water is particularly important because of the hauling distances involved if the cuttings cannot be disposed of in the water surrounding the offshore drilling rig.

If the drilling cuttings recovered at the working floor of the drilling rig are contaminated with one or more hydrocarbonaceous oils for any number of reasons, for example, an oil based drilling mud was used in the drilling operation or oil was employed in a water-based drilling mud to improve lubricity of the drillstring and bit in the wellbore, or the like, the cuttings disposal problem is sensitive from an environmental point of view as well as other obvious points of view.

BRIEF SUMMARY OF THE INVENTION

In accordance with this invention, there is provided a method and apparatus for removing hydrocarbonaceous oil from drilling cuttings so that the solid drilling cuttings themselves can be disposed of offshore in an environmentally acceptable manner.

Accordingly, it is an object of this invention to provide a new and improved method and apparatus for treating drilling cuttings for disposal purposes.

It is another object of this invention to provide a new and improved method for rendering drilling cuttings environmentally acceptable for subsequent offshore disposal.

Other aspects, objects and advantages of this invention will be apparent to those skilled in the art from this disclosure and the appended claims.

DETAILED DESCRIPTION OF THE INVENTION

Figure 1:
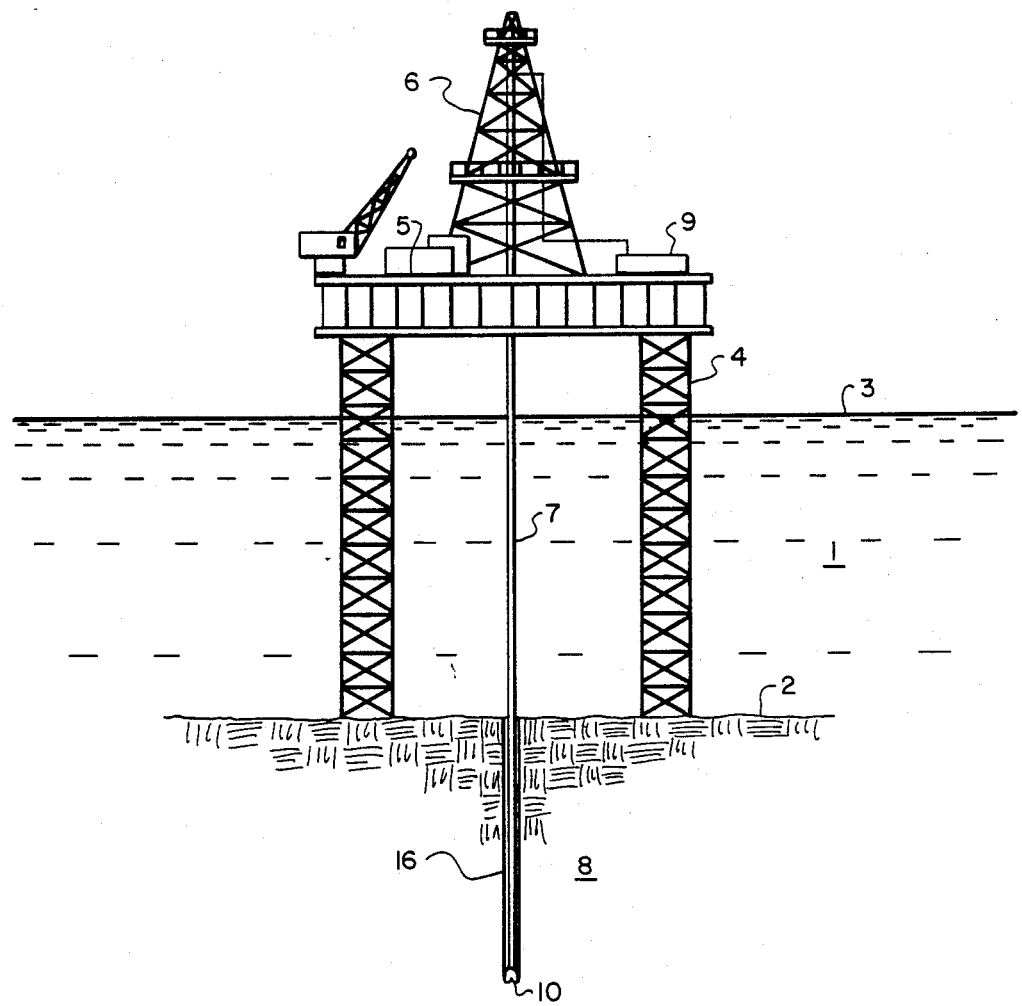
FIG. 1 shows an offshore drilling rig in a body of water.

FIG. 1 shows a body of water 1 underlayed by earth's surface 2 and having a water surface 3. A standard ocean floor supported drilling platform 4 is placed at a location in water body 1. The working floor 5 of platform 4 carries a drilling rig 6 which operates a drillstring 7 downwardly therefrom to ocean floor 2 to drill wellbore 16 in the earth 8. Various ancillary pieces of equipment (not shown) are supported on working floor 5 around rig 6 and including apparatus 9 which is useful in the practice of this invention.

Figure 2:
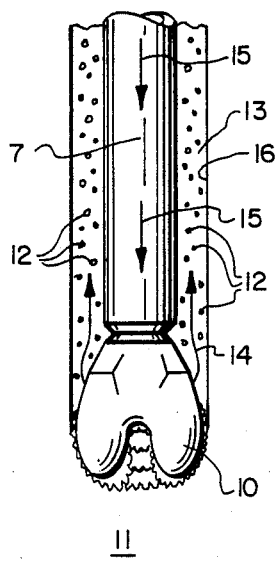
FIG. 2 shows a cross section of a portion of a drillstring and a drillbit working in a wellbore.

FIG. 2 shows the lower end of wellbore 16 with a lower portion of drillstring 7 therein and drillbit 10 carried at the bottom of drillstring 7. In the conventional drilling situation, drillstring 7 is rotated which in turn rotates bit 10, and bit 10 chews up the rock 11 underlying bit 10 to create a large amount of solid particles called drill cuttings 12 which are washed upwardly in annulus 13 of wellbore 16 by drilling fluid 14 which is pumped down the interior of drillstring 7 as shown by arrow 15 outwardly through and/or around drillbit 10 and then upwardly in annulus 13. Drilling fluid 14 thereby washes solid particulate drilling cuttings 12 away from the bottom of wellbore 16 upwardly in annulus 13 back to working floor 5 of platform 4 at which point cuttings 12 have to be disposed of in some manner.

If cuttings 12 are contaminated with one or more hydrocarbonaceous oils or similar material, the cuttings cannot be disposed of by simply dispersing same in water body 1.

In accordance with this invention, the contaminated drilling cuttings are treated in apparatus 9 before subsequent disposition. Apparatus 9 can take many forms so long as it carries out the method of this invention. That method is to recover the mixture of drilling cuttings, water, and hydrocarbonaceous oil or oils at or above the surface 3 of the body of water and then heating this mixture to a first elevated temperature sufficient to vaporize essentially all of the water and a small amount of the oil therefrom to produce a mixture of heated cuttings and liquid oil and a separate mixture of vaporized water and oil. The mixture of vaporized water and oil is recovered separately and the mixture of heated cuttings and liquid oil is subjected to a second elevated temperature which is substantially higher than the first elevated temperature and sufficient to vaporize essentially all of the oil remaining with the cuttings, thereby to produce a dry, oil-free cuttings product and a separate vaporized oil fraction. The vaporized oil fraction is recovered separately from the cuttings whereby the cuttings are now in a condition acceptable for disposal in the body of water or elsewhere as desired.

The type of hydrocarbonaceous oil or oils associated with the cuttings can vary widely but in normal drilling practice will generally have a boiling range of from about 300° to about 700° F. In such a situation, the first elevated temperature will be in the range of from about 212° to about 240° F. while the second elevated temperature will be in the range of from about 300° to about 725° F. The mixture being treated in accordance with the method of this invention is held at the designated temperature or temperatures for a time sufficient to achieve the desired result of either vaporizing all associated water and a small amount of associated oil, or vaporizing all of the remaining oil, all as described hereinabove.

The separately recovered vaporized mixture of water and oil is essentially liquefied and the liquefied water is separated from the liquefied oil so that the both liquids can be recovered separately from one another for reuse or disposition as desired.

The second heating step for vaporizing essentially all the remaining oil associated with the cuttings can be carried out under autogenous pressure or, if desired, a vacuum can be employed so that the second heating step is carried out under at least a partial vacuum thereby achieving a more thorough removal of oil from the solid cuttings.

Figure 3:
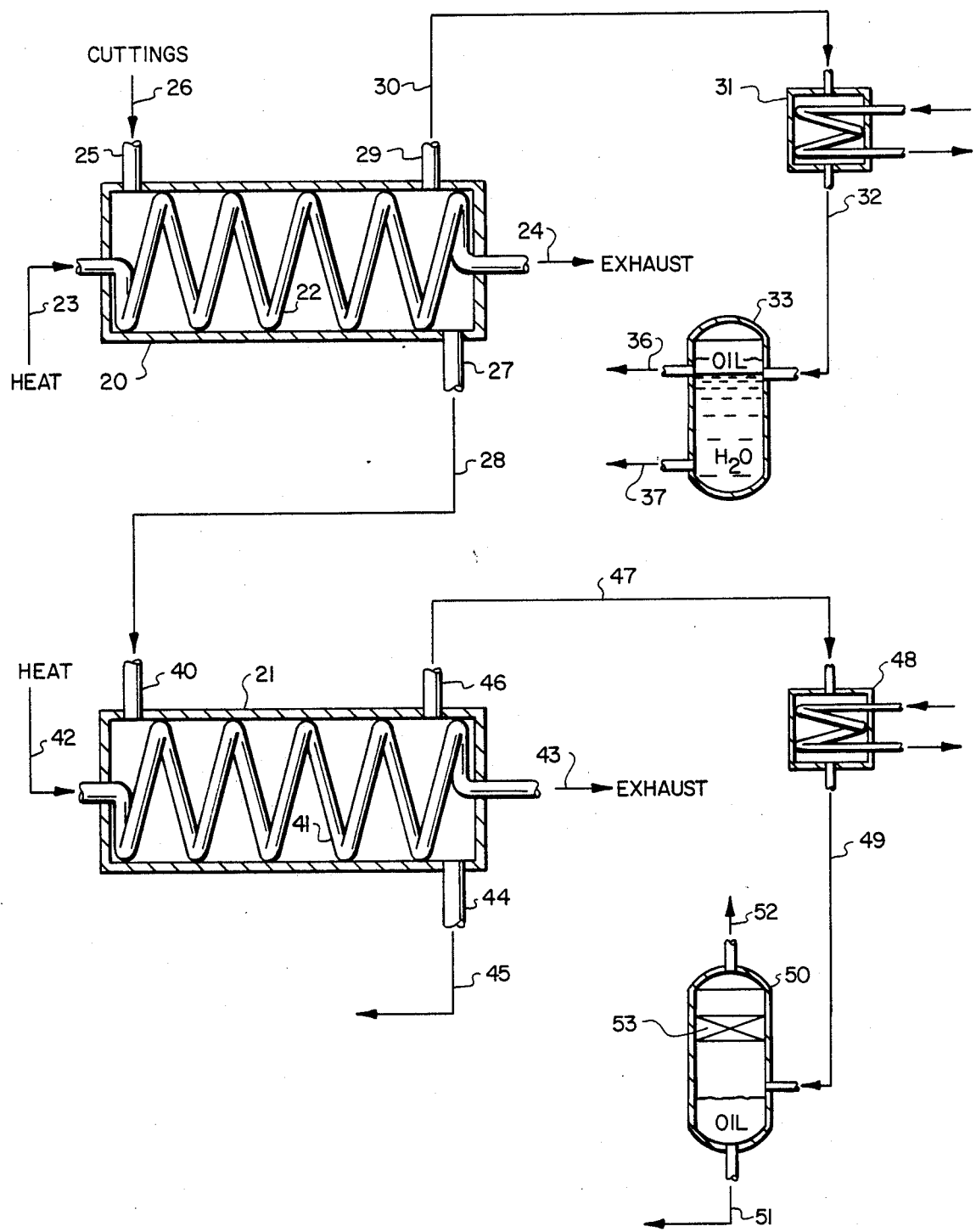
FIG. 3 is a schematic diagram of one embodiment of apparatus useful in this invention.

FIG. 3 shows one apparatus scheme useful in this invention. This scheme employs two separate indirect heat exchangers 20 and 21. Heat exchanger 20 contains a conventional, internal coil 22 therein through which heat is circulated as shown by arrows 23 and 24. The mixture of cuttings, water, and oil is fed into heat exchanger 20 by way of inlet pipe 25 as shown by arrow 26 and passes through the body of heat exchanger 20 outside of coil 22 to outlet pipe 27. While passing through heat exchanger 20, the mixture is heated above the boiling point of water so that heated, dry, oily cuttings are removed by way of pipe 27 as shown by arrow 28, and vaporized water and some oil vapor are separately removed by way of pipe 29 as shown by arrow 30. The vaporous mixture of water and oil in pipe 29 is passed through a conventional cooler or condensor 31 which cools the water and oil vapor mixture to condense same and provide a liquid stream of mixed oil and water which passes, as shown by arrow 32, from condensor 31 to separator 33. In separator 33 the oil and water are allowed to separate by gravity means to provide an upper oil portion 34 and a lower water portion 35. This way, essentially only oil can be withdrawn as shown by arrow 36 for reuse in drilling fluid make up or the like, and essentially only water can be withdrawn as shown by arrow 37 for reuse or reject as desired.

The heated mixture of cuttings and oil from pipe 27 is passed to inlet pipe 40 on heat exchanger 21 for further, more extensive heating. Heat exchanger 21 is constructed like heat exchanger 20 with an internal coil 41 through which passes a heated fluid, as shown by arrows 42 and 43, to indirectly heat the mixture from pipe 40 through the interior of the body of heat exchanger 21 to outlet pipe 44. Outlet pipe 44 produces essentially oil-free, dry drilling cuttings which are now in a condition suitable for disposition in water body 1 or otherwise as desired.

Also removed from heat exchanger 21 by way of pipe 46 is a vaporized oil fraction which passes, as shown by arrow 47, to another conventional cooler 48 in which the oil vapor is cooled and condensed to a liquid state. The liquid oil then passes, as shown by arrow 49, to separator 50 which collects liquefied oil therein for removal, reuse or other disposition as desired as shown by arrow 51. Hot air is vented as shown by arrow 52. Sometimes, in order to be sure that all oil is removed in the direction of arrow 51, and not vented in the direction of arrow 52, a conventional demister 53 can be employed in an upper portion of separator 50 to remove entrained oil from the gas to be vented.

If it is desirable to operate heat exchanger 21 in at least a partial vacuum, a vacuum can be applied to separator 50 such as at arrow 52 to create a vacuum in the interior of heat exchanger 21 external to coil 41 and thereby aid in the vaporization of oil from cuttings. This can help insure oil free cuttings removal by way of pipe 44. Although a vacuum can be employed for heat exchanger 20 as well, it is preferable to operate this heat exchanger essentially at atmospheric or autogenous pressure.

Although FIG. 3 is shown to employ two separate heat exchangers, it is within the scope of this invention to employ two or more heat exchangers in each stage of heating, i.e., two or more heat exchangers for the operation to be conducted FIG. 3 by heat exchanger 20 and two or more other heat exchangers for the operation to be conducted in FIG. 3 by heat exchanger 21.

Figure 4:
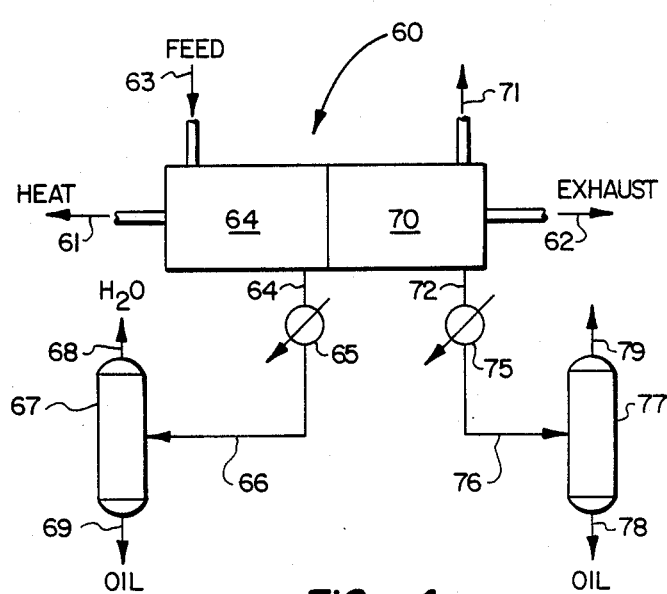
FIG. 4 is a schematic diagram of another embodiment of apparatus useful in this invention.

Also, a single, long heat exchanger could also be employed in this invention as shown in FIG. 4. In FIG. 4, heat exchanger 60 is an indirect heat exchanger essentially as described for heat exchangers 20 and 21 in FIG. 3 with heat passing through an internal coil thereof as represented by arrows 61 and 62. The feed mixture of cuttings, water, and oil enters heat exchanger 60 as shown by arrow 63 and passes therethrough. In the first section 64 of heat exchanger 60, water and some oil is vaporized as described for FIG. 3 and removed by way of pipe 64, cooled and condensed by cooler 65, and the resulting liquid mixture passed by way of pipe 66 to separator 67 in which the water and oil are separated and each recovered separate from one another as shown by arrows 68 and 69. The cuttings and remaining oil passes to second section 70 of heat exchanger 60 in which they are heated to a higher temperature for a time sufficient to vaporize essentially all the remaining oil from the cuttings. Oilfree cuttings are removed by way of pipe 71 separately from vaporized oil which is removed by way of pipe 72. The vaporized oil is cooled by condensor 73 and the liquefied oil passed by way of pipe 76 to collector 77 from which it is recovered. Liquid oil is recovered by way of pipe 78 for reuse or other disposition as desired, hot air is vented by way of pipe 79. The apparatus of FIG. 4, as with the apparatus of FIG. 3 or other apparatus useful within this invention, can use autogenous pressures or a partial vacuum, as desired, in the vaporization of the residual oil from the cuttings.

EXAMPLE

A mixture of drilling cuttings, salt water, and mineral oil is processed in the apparatus shown in FIG. 3. The cuttings, water, oil mixture is heated in heat exchanger 20 to a temperature of about 220° F. for at least 5 minutes under autogenous pressure so that essentially all of the water in the mixture and about 25 percent of the oil present is vaporized and passed to condensor 31. In condensor 31 the vapors are cooled to 90° F. to liquefy same. The liquid mixture of oil and water is passed to separator 33 and allowed to sit under gravity conditions until they naturally separate into upper oil and lower water portions.

The heated mixture of dry oil and cuttings passes to heat exchanger 21 and therein is heated to a temperature of about 650° F. for at least 5 minutes until essentially all of the oil remaining with the cuttings is vaporized so that dry oil-free cuttings are recovered by way of pipe 44 while oil vapor is separately removed to condensor 48 and therein cooled to about 100° F. The liquefied mineral oil is then passed to collector 50 for storage until removed for reuse by way of pipe 51.

Reasonable variations and modifications are possible within the scope of this disclosure without departing from the spirit and scope of this invention.

I claim:

1. Apparatus for treating a mixture of solid particles, water and a hydrocarbon oil such as produced in connection with an earth drilling operation wherein said drilling operation generates a substantial amount of a mixture of solid particles comprising drilling cuttings, water, and at least one hydrocarbon oil, said apparatus comprising: enclosed indirect type heat exchanger means operable for receiving said mixture of cuttings, water, and oil and for heating same to an elevated temperature of not more than about 212 degrees F. to 240 degrees F. and at autogenous pressure sufficient to vaporize essentially all of said water and at least a small amount of said oil to produce a mixture of heated cuttings and a vaporized mixture of water and oil, means operably connected to said heat exchanger means for recovering all of said vaporized mixture of water and oil separately from said heat exchanger means and from said cuttings, means connected to said heat exchanger means for receiving said cuttings and for heating said cuttings to a temperature of about 300 degrees F. to 725 degrees F. sufficient to remove essentially all the oil remaining with said cuttings thereby to produce dry, oil free cuttings and gaseous products of oil from said means for receiving said cuttings and means for receiving said gaseous products separately from said cuttings whereby said cuttings are in a condition acceptable for disposal.

2. The apparatus set forth in 1 including:
means for liquefying said separately recovered vaporized mixture of water and oil, and means for separating said liquids from one another.

3. Apparatus for treating a mixture of solid particles, water and a hydrocarbon oil such as produced in connection with an earth drilling operation wherein said drilling operation generates a substantial amount of a mixture of solid particles comprising drilling cuttings, water, and at least one hydrocarbon oil, said apparatus comprising: a first enclosed indirect type heat exchanger operable for receiving said mixture of cuttings, water, and oil and for heating same at autogenous pressure to a first elevated temperature in the range of about 212 degrees F. to 240 degrees F. and sufficient to vaporize essentially all of said water and a small amount of said oil to produce a mixture of heated cuttings and liquid oil and a vaporized mixture of water and oil, means operably connected to said first heat exchanger for recovering said vaporized mixture of water and oil separately from said first heat exchanger and from said mixture of heated cuttings and liquid oil, a second enclosed indirect type heat exchanger operably connected to said first heat exchanger for receiving said heated cuttings and liquid oil substantially devoid of said vaporized mixture and for heating said mixture of heated cuttings and liquid oil to a second temperature which is substantially higher than said first elevated temperature but does not exceed about 725 degrees F. and sufficient to vaporize essentially all the oil remaining with said cuttings thereby to produce dry, oil free cuttings and vaporized oil, and means for receiving said vaporized oil separately from said cuttings and said second heat exchanger whereby said cuttings are in a condition acceptable for disposal.

4. In a method for treating a mixture of solid particles, water and oil generated by drilling a wellbore in the earth wherein the drilling operation generates a substantial amount of a mixture of solid drilling cuttings, water and at least one hydrocarbonaceous oil, the improvement comprising: providing first heat exchanger means comprising an enclosed indirect type heat exchanger and second means for heating said cuttings to a temperature greater than in said first heat exchanger means, recovering said mixture of cuttings, water and oil, heating said mixture to a first elevated temperature in a range of about 212 degrees F. to 240 degrees F. in said first heat exchanger means sufficient to vaporize essentially all of said water and at least a small amount of said oil to produce heated cuttings and a vaporized mixture of water and oil, recovering said vaporized mixture of water and oil from said first heat exchanger means separately from said cuttings, then heating said cuttings to a second elevated temperature in said second means for heating which is in the range of about 300 degrees F. to 725 degrees F. and sufficient to convert to gaseous products essentially all the oil remaining with said cuttings thereby to produce dry, oil-free cuttings in a condition acceptable for disposal.

* * * * *